United States Patent [19]

Frizot et al.

[11] Patent Number: 4,704,801
[45] Date of Patent: Nov. 10, 1987

[54] DEVICE FOR CHECKING THE VERTICAL ALIGNMENT OF THE UPPER AND LOWER INTERNAL EQUIPMENT OF A PRESSURIZED WATER NUCLEAR REACTOR

[75] Inventors: Alain Frizot, Montcenis; Gerard Cadaureille, Saint Bonnet De Mure; Jean C. Lalére, Lyons; Jean-Yves Machuron, Le Creusot, all of France

[73] Assignee: Framatome, Courbevoie, France

[21] Appl. No.: 890,431

[22] Filed: Jul. 29, 1986

[30] Foreign Application Priority Data

Aug. 2, 1985 [FR] France ............................. 85 11901

[51] Int. Cl.$^4$ ............................................. G21C 17/00
[52] U.S. Cl. ..................................... 33/502; 376/245; 376/258; 376/260; 33/533
[58] Field of Search ............... 376/249, 258, 248, 245, 376/260; 33/502, 180 R, 533, 543, 544, 1 H, 412, 542

[56] References Cited

U.S. PATENT DOCUMENTS

| | | | |
|---|---|---|---|
| 2,395,393 | 2/1946 | Brilliantine | 33/412 |
| 3,165,835 | 1/1965 | Duncan | 33/286 |
| 4,197,652 | 4/1980 | Qurnell et al. | 376/245 |

FOREIGN PATENT DOCUMENTS 0130840 1/1985 European Pat. Off. .
2368118 5/1978 France .

Primary Examiner—Deborah L. Kyle
Assistant Examiner—Daniel Wasil
Attorney, Agent, or Firm—Pollock, Vande Sande & Priddy

[57] ABSTRACT

Device for checking the vertical alignment of the upper and lower internal equipment of a pressurized water nuclear reactor comprising a vertical tubular body (14) onto which are fixed a flange (15) for centering the upper internal equipment on the upper plate (2), a flange (16) for centering on the upper core plate (3) and a lower end member (17) which enables the device (1) to be centered on the lower core plate (4). A metal wire (24) is aligned along the axis of the tubular body (14), its lower part being fixed to the end member (17) and its upper part to a fitting (20) which can move in two horizontal directions at 90°. Electrodes are arranged in the flange (16) around the wire (24), to detect, by virtue of an electrical monitoring circuit (90), contact between the wire (24) and the electrodes when the upper part of the wire is moved by the fitting (20).

7 Claims, 7 Drawing Figures

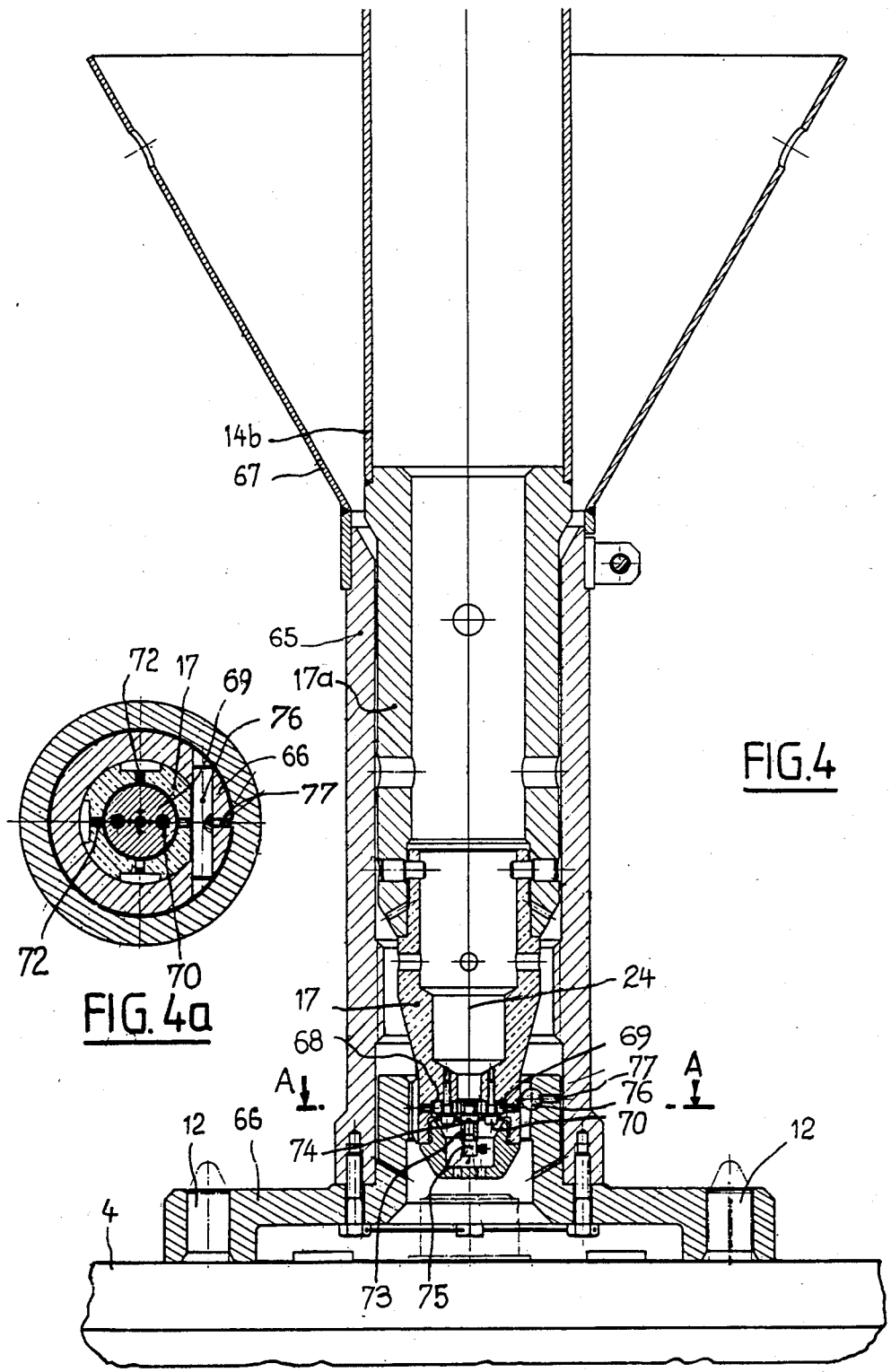

DEVICE FOR CHECKING THE VERTICAL ALIGNMENT OF THE UPPER AND LOWER INTERNAL EQUIPMENT OF A PRESSURIZED WATER NUCLEAR REACTOR

FIELD OF THE INVENTION

The invention relates to a device for checking the vertical alignment of the upper internal equipment and the lower internal equipment of a pressurized water nuclear reactor.

BACKGROUND OF THE INVENTION

Pressurized water nuclear reactors are known, which contain, inside a vessel, assemblies, known as internal equipment, which make it possible, in particular, to provide the support and the screening of the reactor core which consists of fuel assemblies, and which are responsible for guiding the reactor control rods which move vertically inside some of the core assemblies. such internal equipment can be subdivided into lower internal equipment comprising the lower core support plate and the core enclosure, which are suspended inside the vessel, and upper internal equipment which comprises an upper plate and a lower plate, both horizontal, which are connected together by vertical spacers. The lower plate of the upper internal equipment forms the upper core plate.

When the vessel is being fitted out, it is necessary to ensure very good vertical alignment of the upper internal equipment which contains the guide tubes for the control rods and of the lower internal equipment which is responsible for the positioning of the core assemblies. In fact, the reaactor core and the control rod guide tubes are of considerable height, of the order of four meters each. To ensure that the control rods travel under satisfactory conditions inside the guide tubes and in the assemblies situated in the extension of these guide tubes, and to ensure that the control rods fall under gravity into a position of maximum insertion into the core in the event of an emergency shutdown, alignment of the vertical directions in which the control rods travel in the guide tubes and in the assemblies must be ensured within very fine tolerances. These travel directions of the control rods are materialized by guiding members situated in the guide tubes of the upper internal equipment and by the guide tubes which form part of the structure of the assemblies.

The guide tubes in the upper internal equipment consist of an upper part which rests on the upper plate of the upper internal equipment, and a lower part containing the guiding members and arranged between the upper plate of the upper internal equipment and the upper core plate. This lower part of the guide tube rests on the upper core plate and has centering pins intended to cooperate with holes in the upper core plate to ensure the accurate positioning and alignment of the guide tube with the assembly situated vertically below the guide tube.

In the case where new nuclear reactor components are being assembled and adjusted, the alignment-checking operations may be carried out under good conditions, because access is then available to all the parts of the lower and upper internal equipment, which are not irradiated.

In the case of a pressurized water nuclear reactor which has already been in operation, it may be necessary to carry out repairs or replacements of some components of the internal equipment which have sustained some deterioration in use.

Thus, the replacement, during a scheduled shutdown of the power station, of the upper internal equipment assembly of a nuclear reactor which has already been in operation has been envisaged. Such replacement assumes that new, replacement, upper internal equipment is adapted to the irradiated lower internal equipment of the reactor, which is kept in the vessel. This operation must be carried out inside the water-filled vessel, with the irradiated lower internal equipment in place and the core fuel assemblies removed.

Checking of the alignment of the upper internal equipment with the lower internal equipment is very difficult to carry out under these conditions, since direct access to the lower internal equipment kept in the vessel is not available.

Until the present, there was no known device for checking alignment which made it possible to carry out an accurate check of the alignment of new replacement upper internal equipment with irradiated lower internal equipment kept in the vessel.

SUMMARY OF THE INVENTION

The object of the invention is therefore to offer a device for checking the vertical alignment of the upper internal equipment and of the lower internal equipment of a pressurized water nuclear reactor, these equipments being placed in the reactor vessel which is open and filled with water, the upper internal equipment comprising an upper plate supporting the upper part of the reactor guide tubes and a lower plate which forms the upper core plate supporting the lower part of the guide tubes, and the lower internal equipment comprising the lower core plate supporting the fuel assemblies, and the checking of alignment of the internal equipment being carried out with the fuel assemblies and at least some of the guide tubes in the upper internal equipment removed, which device has to enable the alignment of the internal equipment to be checked accurately, expecially in the case of the adaptation of new upper internal equipment onto the lower internal equipment kept in the reactor vessel.

To this end, the device for checking alignment according to the invention comprises:

(a) a vertical tubular body to which are fixed, at its top end, a flange equipped with means enabling it to be centered on a guide tube position on the upper plate of the upper internal equipment, a lower end member for centering at its other end, and an intermediate flange equipped with means enabling it to be centered on a guide tube position on the upper core plate, (b) a means for receiving the lower end member, fixed on the lower core plate for locating this end member in the center of an assembly bottom fitting in the region of the lower core, (c) a metal wire placed substantially along the axis of the tubular body over its entire length and fixed in its lower part to the lower end of the end member and its upper part to a fitting which can move in at least two directions at 90° in the horizontal plane and is mounted on the upper flange, (d) means for accurately determining the movements of the movable fitting, (e) four electrodes fixed to the intermediate flange, the ends of which are arranged on two horizontal axes at 90° around the axis of the guide tube position on which the intermediate flange is placed, and an electrical monitoring circuit which makes it possible to determine when the wire comes into contact with the four electrodes in succession, when its upper end is moved in the direction of each of the electrodes in succession by means of the movable fitting.

BRIEF DESCRIPTION OF THE DRAWINGS

In order that the invention may be more clearly understood, a description will now be given, by way of example of an embodiment of a checking device according to the invention, associated with the internal equipment of a pressurized water nuclear reactor, for checking its alignment.

FIG. 4 is a detailed view of the the lower part of the device, in vertical section.

FIG. 4a is a view in section along A—A in FIG. 4.

DESCRIPTION OF PREFERRED EMBODIMENT

Figure 1:
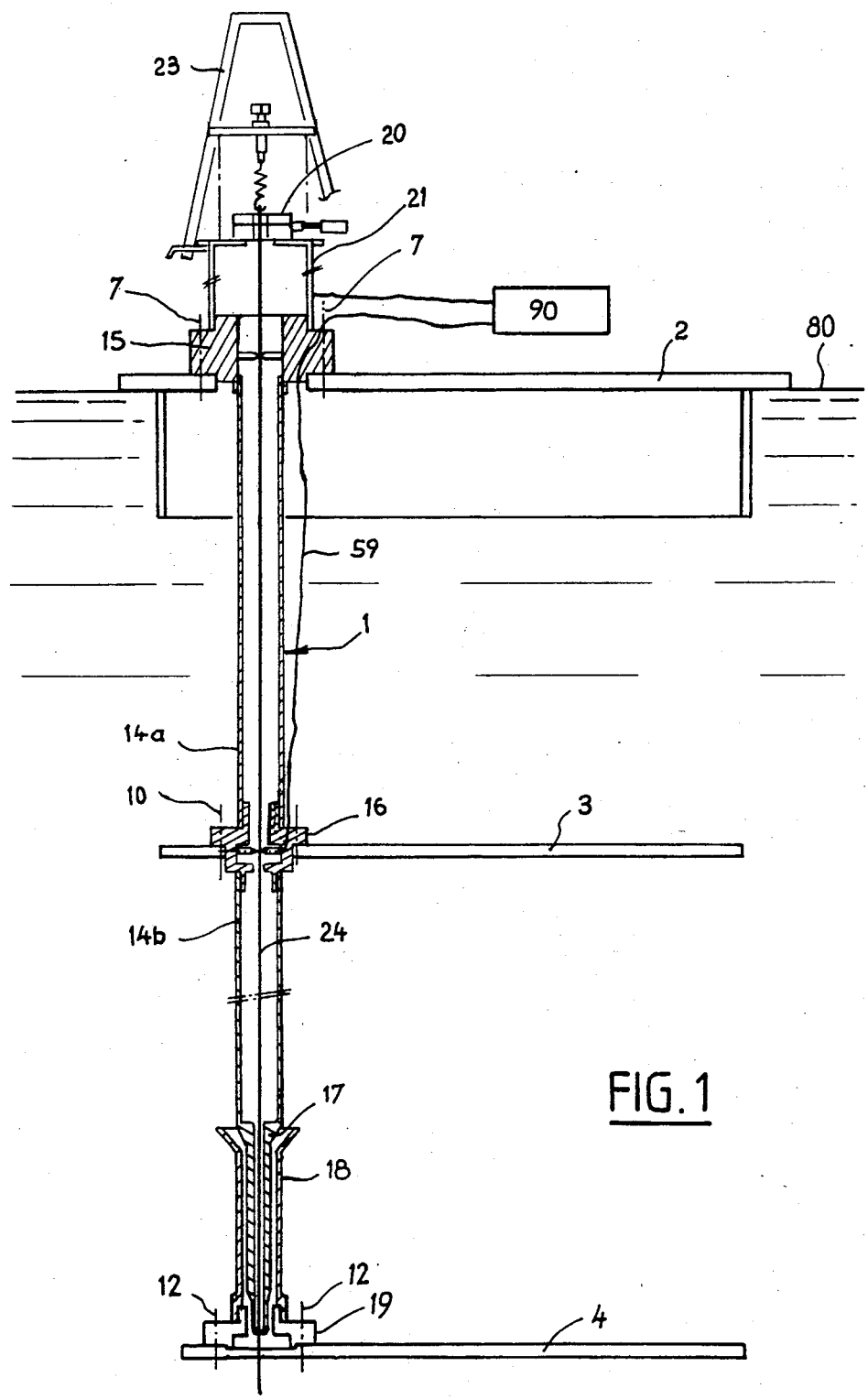
FIG. 1 is a simplified sectional overall view of the device in position on the internal equipment of a pressurized water nuclear reactor.

FIG. 1 shows the device as a whole, indicated generally by reference 1, in a position for making measurements inside the internal equipment of a nuclear reactor, showing only those members thereof which enable the checking device 1 to be installed. FIG. 1 shows only the upper plate 2 of the upper internal equipment, the upper core plate 3 and the lower core plate 4. Plates 2 and 3 form part of the upper internal equipment and plate 4 forms part of the lower internal equipment.

Plate 2 of the upper internal equipment has openings 5 in the region of each of the guide tubes, which it supports with its upper part. This plate 2 also has vertical centering pins 7, only the axes of which are shown in FIG. 1. The flange supporting the upper part of the guide tube has corresponding openings which engage on the centering pins 7 to ensure accurate positioning of the upper part of the guide tube above the upper plate 2 of the upper internal equipment.

The upper core plate 3 has an opening 9 in the region of each of the guide tubes whose bottom part it supports. The openings 5 and 9, respectively, permit the control bars to pass from the upper part to the lower part of the guide tube and from the lower part of the guide tube to the fuel assembly. The upper core plate 3 also has two holes whose axes 10 are shown in FIG. 1, on either side of the opening 9. These holes 10 can engage split pins which are integrally fixed to the flange supporting the lower part of the guide tube.

The lower core plate 4 carries the positioning device in the form of an assembly bottom fitting resting on the plate 4 and consisting of two pins for centering the assembly, whose axes 12 are shown in FIG. 1.

In FIG. 1 it can be seen that the checking device 1 is introduced into the upper and lower internal equipment of the nuclear reactor through the openings 5 and 9 which correspond to a guide tube and is fixed in position by means of the members 7 and 10 and is centered relative to the assembly position corresponding to the guide tube by means of the centering pins 12, in a manner which will be described later.

The checking device 1 consists of a tubular body 14 comprising an upper part 14a and a lower part 14b. At its upper part, the upper part 14a of the tubular body is integrally fixed to a flange 15 which has openings intended to engage on the center pin 7 fixed to the upper surface of the upper plate 2 of the upper internal equipment. The lower end of part 14a of the tubular body is connected to an intermediate flange 16 which is centered on the guide tube position, by means of the holes 10 in the tube plate, in a manner which will be described later. The upper end of the tubular body part 14b is connected to the lower part of the intermediate flange 16 and the lower end of the tubular body part 14b is integrally fixed to the lower end member 17. A tubular member 18, whose axis is vertical, which is funnel-shaped at the top and is fixed on a flange 19, forms the means for receiving the lower end member 17 of the tubular body. The flange 19 has openings which enable it to be centered on a position of an assembly bottom fitting, by means of the pins 12.

A fitting 20 which can move in two perpendicular directions in the horizontal plane is mounted on a tubular support 21 fixed above the flange 15. Also fixed to the upper part of the support 21 is a gantry 22 having vertical columns and a sling bar 23 for handling the checking device 1.

A stainless steel wire 24 with diameter of about 0.5 mm is fixed at its lower end to the central lower part of the end member 17 and at its upper end to the gantry 22 after passing through a wire guide 25 mounted on the movable fitting 20.

The device will now be described in greater detail with reference to FIGS. 2, 3, 4, 2a, 3a and 4a.

Figure 2:
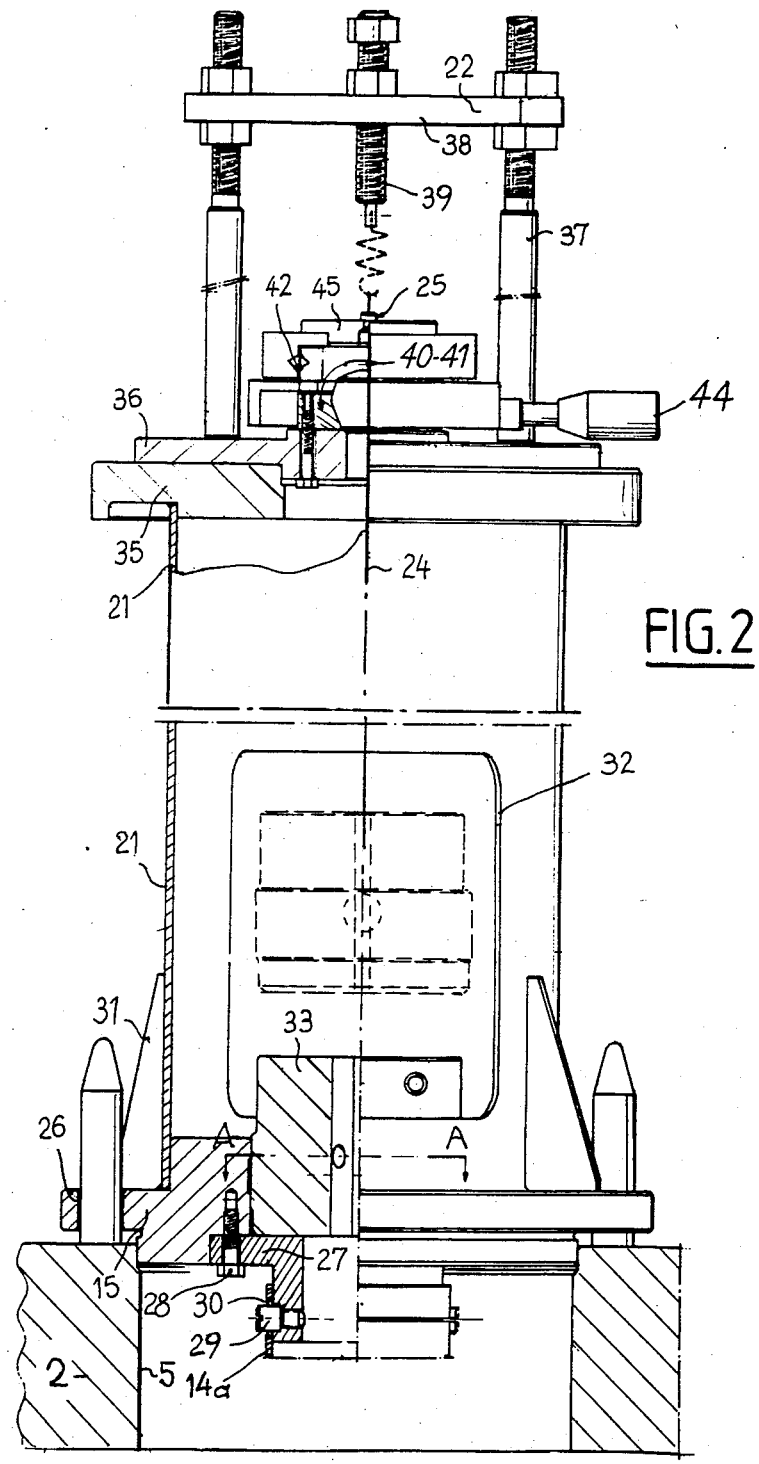
FIG. 2 is a detailed view of the upper part of the device, in vertical section.

FIG. 2 shows the upper flange 15 of the checking device whose lower part is engaged in the upper part of the opening 5 in the upper plate 2 of the upper internal equipment; in its peripheral part, this flange 15 has two openings 26 intended to cooperate with the centering pins 7 on the plate 2, to achieve a positioning of the flange 15 which is similar to the positioning of the lower flange of the guide tube situated above the opening 5.

An assembly flange 27 is fixed to the lower face of flange 15, inside the opening 5, by means of screws 28 which enable the tubular body part 14a of the device to be coupled up by means of screws 29 fixed in the flange 27, the heads of which are engaged in oblong holes 30 passing through the wall of the tubular body 14a. This assembly permits a degree of adaptability in respect of the vertical alignment and the vertical position, between the tubular body 14a and the flanges 27 and 15.

The tubular support 21 whose diameter is larger than the diameter of the body 14 is welded to the top face of the flange 15 and has vertical strengthening members 31 and access parts such as 32 which allow, in particular, access to an electrode carrier block 33, which will be described in detail later.

A support 36, which is shared by the gantry 22 for suspending the wire 24 and by the movable fitting 20 which carries the wire guide 25, is fixed to a flange 35, welded to the upper part of the tubular support 31. The gantry 22 comprises two columns 37 and a cross-beam 38, in the middle of which is fixed the device 39 for adjusting the tension of the wire 24.

The movable fitting 20 comprises a set of two tables 40 and 41, each comprising two members which can move relative to each other by means of ball bearing travellers such as 42. The relative movements of the table components 40 and 41 are determined by micrometer screws such as 44, which enable the movements executed by either of the tables 40 and 41 to be determined with very high accuracy. These tables allow movements in two perpendicular directions in the horizontal plane, and the wire guide 25, in which the wire 24 is engaged with very little clearance, is fixed rigidly to a small plate 45 fixed integrally to the movable fitting of the upper table 41, which is itself carried by the movable fitting of the lower table 40. Thus, the movement of the wire guide 25 and of the upper end of the wire 24 is produced in two perpendicular horizontal directions in such a manner that the movements of this wire may be known with a high degree of accuracy.

Figure 2A:
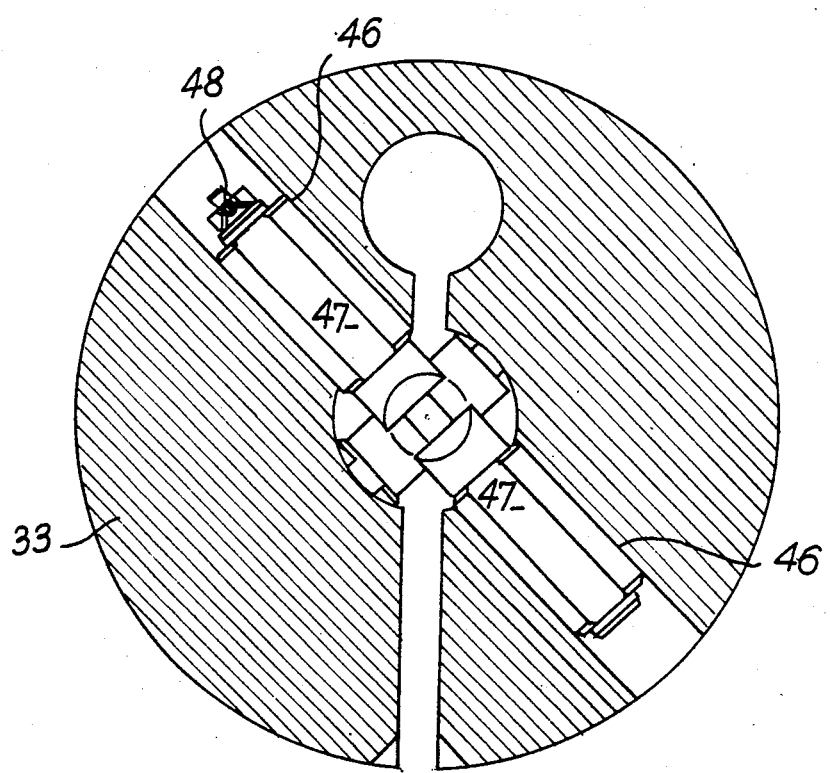
FIG. 2a is a view in section along AA in FIG. 2.

As can be seen in FIG. 2a, the electrode carrier block 33, arranged in the inner bore of the flange 15 has two pairs of radial housings, such as 46, which are offset along the height of the carrier block 33 and each of which contains a radially directed electrode 47 which is electrically insulated from the carrier block 33. Each of the electrodes is supplied with electric current by a conductor 48 by virtue of a measuring circuit which is closed by means of the body of the device 1 being in electrical contact with the wire. When the wire 24 comes into contact with one of the electrodes 47, a signal is produced in the monitoring circuit by the closing of this circuit.

Figure 3:
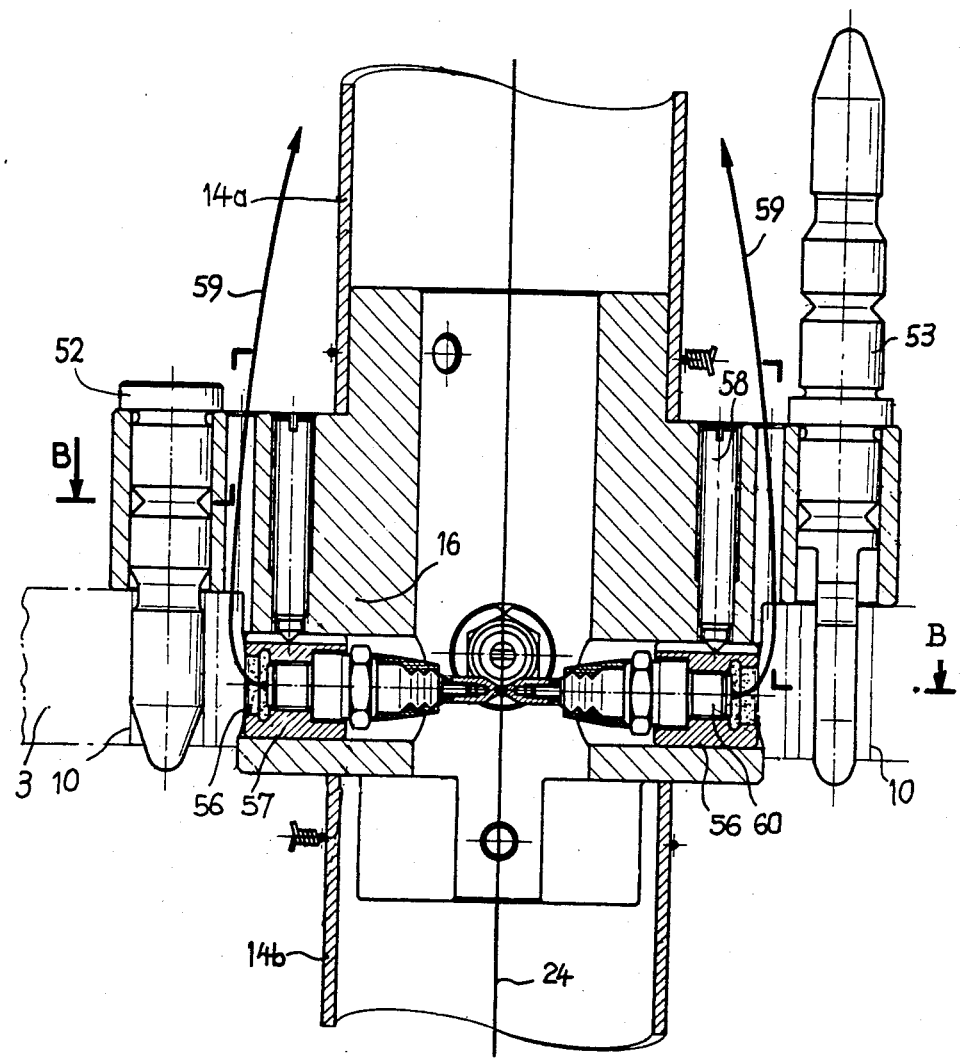
FIG. 3 is a detailed view of the middle part of the device, in the region of the upper core plate, in vertical section.

FIG. 3 shows the intermediate flange 16 of the checking device 1, resting on the upper core plate 3 and connected, at its upper part, to the tubular body 14a and, at its lower part, to the tubular body 14b. The connections between the flange 16 on the one hand, and the tubular bodies 14a and 14b, on the other hand, are made by means of axles such as 50 which pass through the tubular body 14a (or 14b), are engaged in the flange 16 and are held in place by a stainless steel wire 51. A fixing method of this type permits a slight misalignment of the parts 14a and 14b of the body 14 relative to the vertical axis of the flange 16 at the time when the device 1 is installed in the internal equipment of a reactor.

The flange 16 is fixed on the upper core plate 3 by means of pins 52 and 53 which engage in the openings 10 in the upper core plate 3.

The pin 52 is a simple pin which is fixed in the flange 16 by means of a screw 54 engaged in a groove in the pin.

Figure 3A:
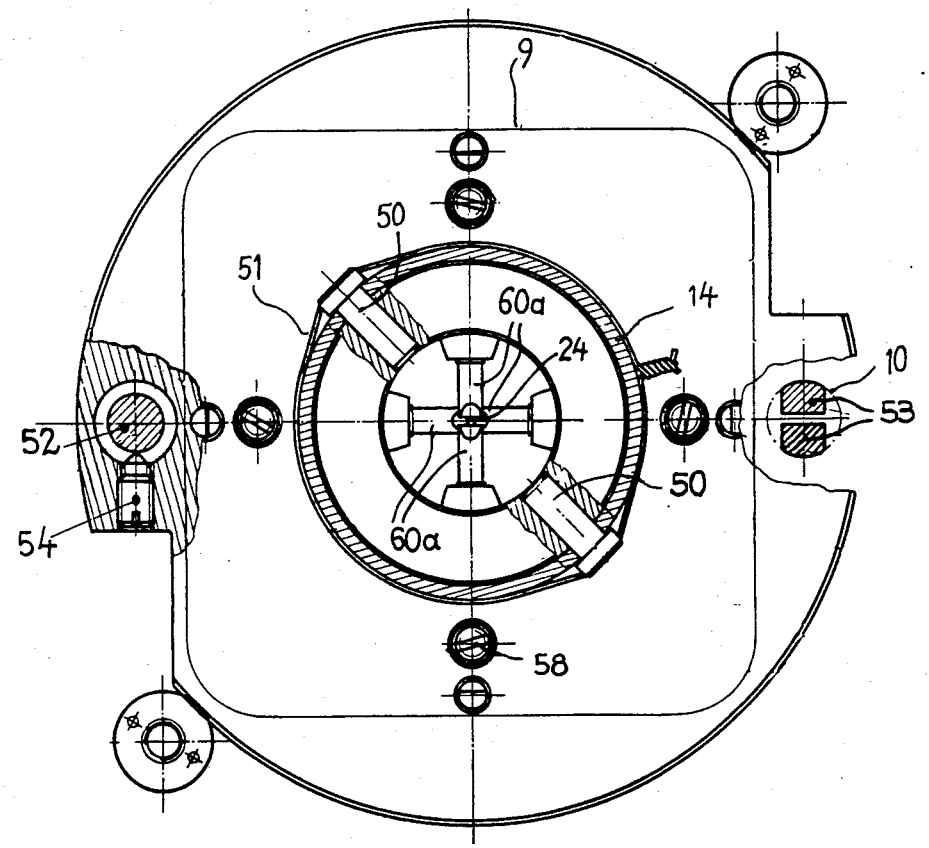
FIG. 3a is a view in section along BB in FIG. 3.

The pin 53 is a double pin, as can be seen in FIG. 3a, an elastic deformation of this pin making it possible to engage it and to hold it in the opening 10 by means of an elastic deformation of both of these pins. This pin is similar to the pins for fixing the lower parts of the guide tubes to the upper core plate.

The flange 16 also has two sets of passage holes 56 situated in each other's extension, at two different levels and in directions which are at 90° to each other. Each of the passage holes 56 contains an electrode carrier 57, held in position in the passage hole 56 by means of a locking screw 58.

In each of the electrode carriers 57 there is an insulated electrode 60 which is connected by a wire 59 to an electrical monitoring and supply circuit. The contact ends 60a of the four electrodes 60 are arranged at 90° intervals around the wire 24, as can be seen in FIG. 3a.

When the wire 24 comes into contact with the end 60a of one of the electrodes 60, the monitoring and supply circuit is closed and a signal is emitted.

FIG. 4 shows the lower core plate 4 which forms part of the lower internal equipment of the reactor and is responsible for supporting the core fuel assemblies. The assembly bottom fittings are fixed in position on the lower core plate 4 by means of the centering pins 12. To make use of the checking device 1, a centering tube 65, which is integrally fixed to a support plate 66 which has openigns enabling it to be centered on the pins 12 is placed in an assembly position. At its upper part, the tube 65 is connected to a funnel-ended guide member 67 which permits the lower end member 17 to be introduced into the tube 65. The end member 17, welded to the lower part of the tubular body 14b, comprises a tube 17a for coupling it to the tubular body 14 and the end member proper attached with screws to the end of the tube 17a. The end member 17 will now be described with reference to FIGS. 4 and 4a. The end member 17 is generally tubular in shape and has a cross-section which decreases from its top part to its bottom part. The lower part of the end member is machined to form a support surface 68, bearing on which is a diaphragm 69, held by screws 70. The screws 70 pass through the diaphragm 69 within holes which make it possible to adjust the position of the diaphragm 69 radially. Four adjusting screws 72 enable the position of the diaphragm to be adjusted in the transverse direction of the end member. The diaphragm 69 carries a calibrated wire guide 74 and, through the intermediary of a spacer 73, a clamp 75. The wire 24 passes through the wire guide 74 and is fixed at its lower part in the clamp 75. The orientation of the end member inside the guide 65 is fixed, when it is introduced, by means of an axle 76 introduced into a housing provided in the support plate 66 for the tube 65 and locked in place with a screw 77. The end member 17 has a flat portion in a position corresponding to the position of the axle 76 which acts as a polarizing device to ensure a specified orientation of the end member. The position of the diaphragm 69 and, as a result, the position of the wire guide 74 are also fixed with high accuracy, so that the wire 24 may be directed precisely along the axis of the assembly position of which the support plate 66 is placed.

The operation of the checking device will now be described, with reference to all the figures.

The checking is done on the inner equipment in the reactor vessel which is open and filled with water. To check the alignment of new upper internal equipment which has just been arranged in the vessel, on the irradiated lower internal equipment, the checking devices are mounted beforehand, dry, in the new internal equipment, on a specially arranged stand. In particular, a set of devices for controlling the alignment, such as the device 1 which has just been described, is mounted on this new internal equipment.

Four devices for controlling alignment are preferably mounted in guide tube positions situated on two axes at 90° and in the vicinity of the periphery of the upper internal equipment, from which a certain number of guide tubes have been removed and, in particular, the guide tubes which are substituted by the devices for checking alignment 1. These devices are placed in a first position, which is slightly higher than their working position in the internal equipment.

The new upper internal equipment, equipped with its checking means, is carried and deposited on the irradiated lower internal equipment retained in the vessel. FIG. 1 shows the position 80 of the water level in the vessel when the internal equipment and the checking devices 1 have been installed. The lower end member 17 of the checking device is introduced into the tube 65, and the flanges 15 and 16 are positioned relative to the plates 2 and 3 by the use of means which have already been described. The checking device is then lowered completely into the internal equipment so that it is placed in its measuring position, as shown in FIG. 1. The lower end of the wire 24 is then accurately centered in respect of the position of the assembly bottom fitting on the lower core plate 4.

The initial position of the upper end of the wire is then determined. To do this, the electrodes 47, arranged at the centering flange 15, which is situated on the plate 2, are first adjusted so as to surround the wire 24 with a small clearance. Using the micrometer screws 44, the upper end of the wire is displaced so that it comes into contact with the ends of each of the electrodes 47 in succession. The middle point between the two contact positions, for each of the electrode directions at 90°, is chosen as the origin. The micrometer screw positions corresponding to the wire being placed at this middle point are noted. The electrodes 47 are then moved apart so as to allow the wire 24 some freedom of transverse movement.

The measurement of alignment as such is then carried out by moving the wire from its initial position to bring it successively into contact with each of the electrodes 60, 60a, situated in the flange 16 which is placed on the upper core plate 3. The movements which are required in the two directions corresponding to each of the micrometer screws and to the alignment direction of the electrodes 60, to bring the wire into contact with the electrodes, are carefully recorded, the contact being perceived as a signal in the monitoring circuit. The electrodes are connected to this circuit 90 by the conductors 59 which pass through the flanges 16 and 15.

The wire 24, the lower end of which is placed in the center of the assembly bottom fitting and the upper end of which is placed on the axis of the guide tube which corresponds to this assembly, is then directed towards the origin, with high accuracy, along the direction of travel of the control rods.

The electrodes 60 are arranged, furthermore, so that they are at equal distances around the axis of the lower part of the guide tube, at the level of the upper core plate 3, this axis being defined by the holes in the plate 3 which are entered by the pins of the centering flange 16.

Comparison of the degrees of movement of the wire required to bring it into successive contact with the electrodes 60 makes it possible, therefore, to determine with great accuracy the quality of the alignment of the upper internal equipment relative to the lower internal equipment, which defines the direction of the vertical and rectilinear travel of the control rods.

By comparing the measurements obtained with the four checking devices 1 situated in different places at the periphery of the upper internal equipment it is possible to determine unambiguously the errors in the positioning of the upper internal equipment relative to the lower internal equipment.

It can be seen, therefore, that the device according to the invention makes it possible to carry out, quickly and safely, checking of the alignment of the upper internal equipment and of the lower internal equipment, situated underwater in the vessel of a nuclear reactor. During the measurement as such, the device according to the invention does not require any interference with the internal eqipment, and only a displacement of the upper end of the wire, which is perfectly accessible and arranged above the water level is necessary, the contact between the measuring wire and the electrodes in the region of the lower core plate being detected by a signal in a measuring circuit arranged in the vicinity of the upper part of the checking device.

The invention is not restricted to the embodiment just described. Thus, other methods for fixing or moving the upper end of the wire can be employed, although these movements must, nevertheless, be measured carefully. It is also possible to use other ways of constructing the electrodes, and the monitoring circuit may assume any suitable form in order to provide the operator responsible for the checking with a contact signal.

Lastly, the device according to the invention may be used not only for checking the alignment of new internal equipment on the irradiated internal eqipment in the reactor vessel and underwater, but also for checking the alignment of new upper internal equipment on lower internal equipment which is also new, when the nuclear reactor is being constructed.

What is claimed is:

1. Device for checking the vertical alignment of the upper internal equipment and of the lower internal equipment of a pressurized water nuclear reactor, these equipments being placed in the reactor vessel which is open and filled with water, the upper internal equipment comprising an upper plate (2) supporting the upper part of the guide tubes of the reactor, and a lower plate (3) which forms the upper core plate supporting the lower part of the guide tubes, and the lower internal equipment comprising the lower core plate (4) supporting the fuel assemblies, and the checking of alignment of the equipment being carried out with the fuel assemblies and at least some of the guide tubes in the upper internal equipment removed, which device comprises:

(a) a vertical tubular body (14) on which are fixed a first flange (15), at its upper end, provided with means (26) enabling it to be centered on a guide tube position on the upper plate (2) of the upper internal equipment, a lower end member (17) for centering at its other end, and a second, intermediate flange (16) equipped with means (52, 53) enabling it to be centered on a guide tube position on the upper core plate (3);

(b) means for receiving (65) the lower end member (17), fixed on the lower core plate (4), for placing said lower end member (17) in the center of an assembly bottom fitting, in the region of the lower core plate (4);

(c) a metal wire (24) placed substantially along the axis of the tubular support (14) and along its entire length, the lower end of which is fixed to the lower end of the end member (17) and the upper end of which is fixed to a fitting (20) which can move in at least two directions at 90° in the horizontal plane;

(d) means for determining accurately the movements of the movable fitting;

(e) four electrodes fixed to the intermediate flange (16) whose ends are arranged on two horizontal axes at 90° around the axis of the guide tube position on which the intermediate flange (16) is placed; and (f) an electrical monitoring circuit (59, 90) which makes it possible to detect when the wire comes into successive contact with the four electrodes (60) when its upper end is moved by means of the movable fitting (20) in the direction of each of the electrodes (60) in succession.

2. Checking device according to claim 1, wherein the tubular body (14) comprises an upper part (14a) connected at its upper end to said first flange (15) and at its lower end to said second flange (16), and a lower part (14b) connected at its upper end to said second flange (16) and at its lower end to the end member (17).

3. Checking device according to claim 2, wherein the upper tubular part (14a) and the lower tubular part (14b) are connected to said first and second flanges (15, 16) by means of devices (29, 50, 51) which permit the tubular casing (14) to be adapted by inclining the parts (14a and 14b) relative to the theoretical axis of said first and second flanges (15, 16).

4. Checking device according to claim 1, wherein four electrodes (47) are arranged inside the upper flange (15), around the wire (24), along two horizontal directions at 90°, said electrodes being connected to the monitoring circuit (90) to determine the initial position of the upper end of the wire (24).

5. Checking device according to claim 1, wherein the movable fitting (20) consists of two tables (40, 41) having a ball bearing traveller (42) and placed horizontally and at 90° to each other, and two micrometer screws (44) each associated with the movable member of a table (40, 41).

6. Checking device according to claim 1, wherein the upper end of the wire is connected to a gantry (22) fixed to the upper flange (15) through the intermediary of a device (39) for adjusting the tension of the wire.

7. Checking device according to claim 1, wherein the end member (17) comprises a diaphragm (69) whose transverse position in the end member can be adjusted by means of screws (72), carrying a wire guide (74) through which the wire (24) passes.

* * * * *